United States Patent Office 3,414,629
Patented Dec. 3, 1968

3,414,629
CYCLOOLIGOMERIZATION
Marvin A. McCall and Harry W. Coover, Jr., Kingsport, Tenn., assignors to Eastman Kodak Company, Rochester, N.Y., a corporation of New Jersey
No Drawing. Filed May 13, 1965, Ser. No. 455,636
9 Claims. (Cl. 260—666)

ABSTRACT OF THE DISCLOSURE

A cyclooligomerization catalyst system comprising zerovalent nickel complexed with an organo-phosphorus complexing ligand and containing an excess of at least 24 moles of the organo-phosphorus complexing ligand per mole of nickel and processes employing these catalysts for the production of cyclooctadiene from a 1,3-diene.

---

This invention relates to a novel chemical process and more particularly to a novel process for the production of cyclic oligomers from 1,3-dienes and to novel catalyst systems which are useful in the process.

Cyclic oligomers have been prepared from 1,3-dienes by a number of methods. For example cyclooctadienes and 4-vinylcyclohexenes have been prepared by the ther- and 4-vinyl-cyclohexenes have been prepared by the thermal dimerization of 1,3-dienes and these and other cyclic oligomers have been prepared by contacting a 1,3-diene with complexed zerovalent nickel. These known processes are characterized by one or more serious deficiencies. Thus, the predominant products from the thermal dimerization of 1,3-dienes are the 4-vinylcyclohexenes but the highly desired cyclooctadienes are obtained in low yields and conversions. The complexed zerovalent nickel catalysts which have heretofore been employed in cyclooligomerization processes are extremely unstable and therefore require special handling procedures and, in addition, catalyze the formation of other products, thus decreasing the yield of the highly desired cyclooctadienes.

We have discovered a novel catalyst system for cyclooligomerization processes which, when employed in accordance with the process of our invention, is highly selective for the production of cyclooctadienes from 1,3-dienes and, in addition, is exceptionally stable and therefore does not require the special catalyst handling procedures which have heretofore been needed with zerovalent nickel catalysts. Our invention depends, in part, upon our discovery that solutions of complexed zerovalent nickel in a large excess of the organo-phosphorous complexing ligand are unexpectedly stable when exposed to normal environmental conditions and that such solutions are also unexpectedly effective for the production of cyclooctadienes from 1,3-dienes when employed in accordance with the process of our invention.

The novel catalyst systems within the scope of our invention are those solutions of complexed zerovalent nickel in an excess of the organo-phosphorous complexing ligand in which the mole ratio of excess ligand to zerovalent nickel is at least 10:1 and are preferably such solutions in which the mole ratio of excess ligand to zerovalent nickel is at least 24:1.

The preferred organo-phosphorous compounds for use as complexing ligands and for use as solvents in preparing our novel catalyst systems are tri(hydrocarbyl) phosphines and tri(hydrocarbyl) phosphites. The useful tri(hydrocarbyl) phosphines can be represented by the formula:

R₃P 

and the useful tri(hydrocarbyl) phosphites can be represented by the formula:

(RO)₃P in which R is an aliphatic or aromatic hydrocarbyl group. The hydrocarbyl group R preferably has from 1 to 10 carbon atoms. Examples of the aliphatic groups which R can represent are alkyl, alkenyl, alkynyl, cycloalkyl, cycloalkenyl, etc. Examples of the aromatic groups which R can represent are the mononuclear carbocyclic aryl or aralkyl groups such as phenyl, o-tolyl, m-tolyl, p-tolyl, benzyl, xylyl, etc. R, when alkyl, is typically methyl, ethyl, propyl, isopropyl, butyl, sec-butyl, tert-butyl, isobutyl, pentyl, hexyl, heptyl, octyl, 2-ethylhexyl, nonyl, decyl, etc. Examples of the alkenyl substituents which R can be include vinyl, 1-propenyl, 2-butenyl, 4-pentenyl, 1-hexenyl, 3-heptenyl, 1-octenyl; 2-nonenyl; 5-decenyl, etc. R, when alkynyl, is typically ethynyl, 1-propynyl, 3-butynyl, 3-pentynyl, 1-hexynyl, 4-heptynyl, 1-octynyl, 2-nonynyl, 5-decynyl. R, when cycloalkyl, is typically cyclobutyl, cyclopentyl, cyclohexyl, cycloheptyl, etc., and, when cycloalkenyl, is typically cyclobutenyl, cyclopentenyl, cyclohexenyl, cycloheptenyl, etc.

The complexed zerovalent nickel component of our novel catalyst system can be represented by the formula:

(R₃P)₂Ni 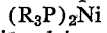

when the complexing ligand is a tri(hydrocarbyl) phosphine and by the formula:

[(RO)₃P]₂Ni 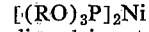

when the complexing ligand is a tri(hydrocarbyl) phosphite. The hydrocarbyl groups, R, in the preceding formulae can be the same or different and can be aliphatic or aromatic as explained hereinbefore.

The novel catalyst system of invention can be prepared by reducing a nickel compound in the presence of the complexing ligand and then adding sufficient complexing ligand to obtain the desired proportion of excess ligand. Alternatively, the reduction of the nickel compound can be carried out in the presence of the entire amount of complexing ligand. In either event, the resulting catalyst solution should contain at least 10 moles of excess ligand per mole of zerovalent nickel and preferably at least 24 moles of excess ligand per mole of zerovalent nickel. As hereinbefore stated, the novel catalyst systems of our invention are unexpectedly stable and are especially useful in the manufacture of cyclooctadienes such as 1,3-cyclooctadienes and 1,5-cyclooctadienes from 1,3 dienes in that the catalyst system is more selective for the highly desired cyclooctadienes than other known catalyst systems.

Examples of the tri(hydrocarbyl) phosphine compounds which are useful as the complexing ligands and as the catalyst solvents are compounds such as trimethyl phosphine, triethyl phosphine, tripropyl phosphine, tridecyl phosphine, triphenyl phosphine, tri(o-tolyl) phosphine, tricyclobutyl phosphine, tri(1-cyclopentenyl) phosphine, tri(2-pentynyl) phosphine, etc. Examples of the tri(hydrocarbyl) phosphite compounds which are useful as complexing ligands and as catalyst solvents are compounds such as trimethyl phosphite, tripropyl phosphite, tributyl phosphite, trioctyl phosphite, triphenyl phosphite, tri(o-tolyl) phosphite, tricyclobutyl phosphite, tricyclopentyl phosphite, triethynyl phosphite, tri(2-cyclohexenyl) phosphite, etc.

The process of our invention is carried out by contacting a 1,3-diene with the novel catalyst system of our invention. Included among the 1,3-dienes which are useful in the process of our invention are those which have been employed in known cyclooligomerization processes. Compounds such as 1,3-butadiene; isoprene; piperylene, chloroprene; 2,3-dichloro-1,3-butadiene; 2,3-dimethyl- 1,3-butadiene; etc. are among those which are useful in our process.

The reaction is generally carried out at a temperature of about 20° C. to about 225° C. and preferably at about 80° C. to about 175° C. The reaction is preferably carried out in the liquid phase and the reaction pressure is therefore equal to or greater than the vapor pressure of the reaction mixture at the reaction temperature. In general, preferred pressures range from about atmospheric pressure to super-atmospheric pressures of 150 atmospheres or more. The time required for the reaction usually varies from about 10 minutes to several hours or more, depending upon the reaction temperature. Especially suitable reaction times range from about 15 minutes to about 2 hours.

The reaction can be carried out with or without an added inert solvent. Among the useful inert solvents which can be employed are ethers such as diethyl ether, etc.; aromatic hydrocarbons such as benzene, toluene, mesitylene, etc.; aliphatic hydrocarbons such as petroleum, naphtha, hexane, octane, etc.; and heterocyclic compounds such as tetrahydrofuran. However, it is preferred to employ no additional solvent, the large excess of complexing ligand serving as the reaction medium.

The catalyst concentration employed in the process of our invention can be widely varied. Catalyst concentrations of from about $2 \times 10^{-5}$ mole of nickel per mole of 1,3-diene to about $75 \times 10^{-5}$ mole of nickel per mole of 1,3-diene are generally employed. However, higher or lower concentrations of nickel can be used and are often preferred. A preferred catalyst concentration range is from about $3 \times 10^{-5}$ mole of nickel per mole of 1,3-diene to about $50 \times 10^{-5}$ mole of nickel per mole of 1,3-diene.

The novel catalyst compositions of the invention are unexpectedly stable to the action of air and moisture and retain their activity after exposure to air or moisture for several hours. Known zerovalent nickel catalysts generally lose their activity after exposure to air or moisture for only a few minutes. The process of our invention is unexpectedly selective for the formation of cyclooctadienes, e.g. 1,3-cyclooctadienes and 1,5-cyclooctadienes.

The cyclooctadienes are produced in unexpectedly high conversions with unexpectedly high catalyst efficiencies when our novel catalyst system is employed in accordance with the process of our invention. Thus, in a series of tests in which the novel catalyst system of our invention was employed in our cyclooligomerization process, catalyst efficiencies as high as $71.1 \times 10^4$ grams of cyclooctadiene per mole of nickel were achieved. In a series of comparison tests the highest catalyst efficiency achieved for a known zerovalent nickel catalyst was $22.5 \times 10^4$ grams of cyclooctadiene per mole of nickel. In addition, the known catalysts are not as selective for the highly desired cyclooctadienes as the novel catalyst systems of our invention.

The following example illustrates the process of our invention.

EXAMPLE 1

Dry nickel acetylacetonate (2.6 g., 0.01 mole) was dissolved in 50 cc. of tri(o-tolyl)phosphite. Triethyl aluminum (2.5 g., 0.02 mole) was slowly added to this mixture with stirring to reduce the nickel acetylacetonate to zerovalent nickel. The mixture was then diluted to 96 cc. with tri(o-tolyl)phosphite. The resulting solution contained about 24 moles excess tri(o-tolyl)phosphite per mole of nickel. Portions of this catalyst solution were then used in manufacturing cyclooctadienes from 1,3-butadiene according to the following procedure. The catalyst and 150 cc. (93 g., 1.73 moles) of butadiene were charged to a stainless steel autoclave. The autoclave was heated to 130° C. for 2 hours. The composition of the reaction product was determined by gas chromatography and the percent of butadiene conversion to cyclooctadiene and to other cyclic oligomers was calculated based on the total weight of butadiene charged. A series of runs were made according to the above procedure, using diminishing amounts of the catalyst in successive runs. The results of the series of runs are summarized in Table I, below.

TABLE I
[Oligomerization Results Obtained With Catalyst Prepared in Excess Tri-o-tolyl Phosphite]

| Run No. | Aliquot Cat. Soln., cc. | Total Wt. Cat. Comp., g. | Moles, Ni | Butadiene Charged, g. | Cat. Conc. Moles Ni/ Mole Butadiene | Total Wt. Reaction Prod., g. | Percent 4. V.C.H.[1] Conversion | Percent C.O.D.[2] Conversion | Percent C.D.T.[3] Conversion | Efficiency g.COD/ g.[4] Cat. | Efficiency g.COD/ Mole Ni |
|---|---|---|---|---|---|---|---|---|---|---|---|
| 1 | 12 | 1.50 | $12.5 \times 10^{-4}$ | 93 | $72.5 \times 10^{-5}$ | 101.0 | 11.3 | 87.4 | 0 | 54.0 | $6.5 \times 10^4$ |
| 2 | 12 | 1.50 | $12.5 \times 10^{-4}$ | 93 | $72.5 \times 10^{-5}$ | 103.0 | 11.5 | 88.0 | 0 | 54.5 | $6.54 \times 10^4$ |
| 3 | 6 | 0.75 | $6.25 \times 10^{-4}$ | 93 | $36.3 \times 10^{-5}$ | 93.0 | 9.3 | 85.0 | 0 | 105.3 | $12.6 \times 10^4$ |
| 4 | 6 | 0.75 | $6.25 \times 10^{-4}$ | 93 | $36.3 \times 10^{-5}$ | 98.0 | 8.5 | 92.0 | 0 | 114.0 | $13.7 \times 10^4$ |
| 5 | 3 | 0.378 | $3.125 \times 10^{-4}$ | 93 | $18.2 \times 10^{-5}$ | 90.0 | 8.0 | 83.4 | 0.5 | 205.0 | $24.8 \times 10^4$ |
| 6 | 3 | 0.378 | $3.125 \times 10^{-4}$ | 93 | $18.2 \times 10^{-5}$ | 95.0 | 7.5 | 91.3 | 1.0 | 224.4 | $27.2 \times 10^4$ |
| 7 | 1 | 0.126 | $1.04 \times 10^{-4}$ | 93 | $6.05 \times 10^{-5}$ | 87.0 | 7.8 | 70.0 | 0.7 | 517.0 | $62.6 \times 10^4$ |
| 8 | 1 | 0.126 | $1.04 \times 10^{-4}$ | 93 | $6.05 \times 10^{-5}$ | 89.0 | 6.1 | 79.5 | 1.5 | 585.0 | $71.1 \times 10^4$ |
| 9 | ½ | 0.063 | $0.52 \times 10^{-4}$ | 93 | $3.02 \times 10^{-5}$ | 36.0 | 7.8 | 18.5 | 0.0 | 273.0 | $33.1 \times 10^4$ |

[1] V.C.H.=4-vinyl cyclohexene, percent is based on amount of butadiene charged. [2] C.O.D.=1,3- and 1,5-cyclooctadiene, percent is based on the amount of butadiene charged. [3] C.D.T.=1,5,9-cyclododecatriene, percent is based on the amount of butadiene charged. [4] Catalyst Efficiency =
$$\frac{(\text{Percent conversion COD}) (\text{g. butadiene charged})}{\text{Total wt. of catalyst components}} = \frac{\text{Total wt. yield COD}}{\text{Total wt. of catalyst components}}$$

A series of experimental runs employing a known cyclooligomerization catalyst were carried out in accordance with the procedure of Example 2, below, for comparative purposes.

EXAMPLE 2

Nickel acetylacetone (2.6 g., 0.01 mole) was dissolved in about 50 cc. of mesitylene. Tri(o-tolyl) phosphite (7.0 g., 0.02 mole) was next added to the solution of nickel acetylacetonate in mesitylene with stirring. Tri-ethyl aluminum (2.5 g., 0.02 mole) was slowly added to the mixture to reduce the nickel acetylacetonate to zerovalent nickel. The resulting mixture was then diluted to 96 cc. with mesitylene. The concentration of nickel in the catalyst solution was thus the same as the concentration of nickel in the catalyst solution of Example 1. Portions of this catalyst solution were then used in the cyclooligomerization of butadiene according to the procedure of Example 1. Thus, a portion of the catalyst solution and 150 cc. (93 g., 1.72 moles) of butadiene were charged to a stainless steel autoclave. The autoclave was heated to 130° C. for 2 hours. The composition of the reaction mixture was determined by gas chromatography and the percent conversion of butadiene to cyclooctadiene and to other cyclic oligomers was calculated based on the total weight of butadiene charged. A series of such runs were conducted using diminishing amounts of catalyst in succeeding runs. The results obtained are summarized in Table II, below.

TABLE II

[Oligomerization Results Obtained With Catalyst Prepared in Mesitylene Solvent]

| Run No. | Aliquot Cat. Soln., cc. | Total Wt. Cat. Comp., g. | Moles, Ni | Butadiene Charged, g. | Cat. Conc. Moles Ni/ Mole Butadiene | Total Wt. Reaction Prod., g. | Percent 4.V.C.H.[1] Conversion | Percent C.O.D.[2] Conversion | Percent C.D.T.[3] Conversion | Efficiency g.COD/ g.[4] Cat. | Efficiency g.COD/ Mole Ni |
|---|---|---|---|---|---|---|---|---|---|---|---|
| 1 | 12 | 1.5 | $12.5 \times 10^{-4}$ | 93 | $72.5 \times 10^{-5}$ | 101.2 | 8.6 | 82.4 | 6.2 | 51.0 | $6.12 \times 10^4$ |
| 2 | 6 | 0.75 | $6.25 \times 10^{-4}$ | 93 | $36.3 \times 10^{-5}$ | 96.0 | 6.4 | 81.3 | 9.6 | 101.0 | $12.5 \times 10^4$ |
| 3 | 3 | 0.378 | $3.125 \times 10^{-4}$ | 93 | $18.2 \times 10^{-5}$ | 94.0 | 6.1 | 74.7 | 16.4 | 184.0 | $22.5 \times 10^4$ |
| 4 | 3 | 0.378 | $3.125 \times 10^{-4}$ | 93 | $18.2 \times 10^{-5}$ | 95.0 | 5.8 | 75.0 | 17.8 | 184.5 | $22.5 \times 10^4$ |
| 5 | 2 | 0.252 | $2.08 \times 10^{-4}$ | 93 | $12.1 \times 10^{-5}$ | 34.0 | 13.6 | 6.4 | 2.2 | 23.6 | $2.86 \times 10^4$ |
| 6 | 1 | 0.126 | $1.04 \times 10^{-4}$ | 93 | $6.05 \times 10^{-5}$ | 48.0 | 18.5 | 9.6 | 7.9 | 70.8 | $8.6 \times 10^4$ |

[1] 4 V.C.H.=4-vinyl cyclohexene, percent is based on amount of butadiene charged. [2] C.O.D.=1,3- and 1,5-cyclooctadiene, percent is based on amount of butadiene charged. [3] C.D.T.=1,5,9-cyclododecatriene, percent is based on amount of butadiene charged. [4] Catalyst Efficiency=
$$\frac{\text{(Percent conversion COD) (g. butadiene charged)}}{\text{Total wt. of catalyst components}} = \frac{\text{Total wt. yield COD}}{\text{Total wt. cat. components}}$$

A comparison of the stability of our novel catalyst system with known catalysts was made in accordance with the procedure of Example 3, below.

EXAMPLE 3

A portion of the catalyst solution from Example 1 was placed in a 50 cc. beaker and exposed to air for 3 hours. A portion of the catalyst solution prepared in Example 2 was placed in a separate 50 cc. beaker and also exposed to air for 3 hours. Experimental runs employing the exposed catalysts were carried out according to the procedures of Examples 1 and 2. The conversion of 1,3-butadiene to cyclooctadiene was only 0.1 percent (trace) when 1,3-butadiene was subjected to cyclooligomerization using the catalyst prepared according to the method of Example 2 which had been exposed to air for 3 hours whereas our novel catalyst, after a 3 hour exposure to air, gave a conversion of 5.7 percent. A summary of the results achieved with the novel catalyst of our invention after exposure to air and the results achieved with a known catalyst after exposure to air are summarized in Table III.

TABLE III

| Solvent | Aliquot Soln., cc. | Air Exposure Time, Hr. | Total Wt. Cat. Comp., g. | Moles, Ni | Cat. Conc. Moles Ni/Mole Butadiene | Total Wt. Reaction Prod., g. | Percent 4 V.C.H.[1] Conversion | Percent C.O.D.[2] Conversion | Percent C.D.T.[3] Conversion |
|---|---|---|---|---|---|---|---|---|---|
| Phosphite | 3 | 0 | 0.378 | $3.125 \times 10^{-4}$ | $18.2 \times 10^{-5}$ | 95 | 7.5 | 91.3 | 1.0 |
| Mesitylene | 3 | 0 | 0.378 | $3.125 \times 10^{-4}$ | $18.2 \times 10^{-5}$ | 95 | 5.8 | 75.0 | 17.8 |
| Phosphite | 3 | 3 | 0.378 | $3.125 \times 10^{-4}$ | $18.2 \times 10^{-5}$ | 25 | 8.9 | 5.7 | |
| Mesitylene | 3 | 3 | 0.378 | $3.125 \times 10^{-4}$ | $18.2 \times 10^{-5}$ | 20 | 12.0 | 0.1 | |

[1] 4-V.C.H.=vinyl cyclohexene. [2] C.O.D.=1,3- and 1,5-cyclooctadiene. [3] C.D.T.=1,5,9-cyclododecatriene.

As can be seen from the preceding examples, the novel cyclooligomerization catalyst system of our invention is especially effective for the cyclooligomerization of 1,3-butadiene to cyclooctadienes. The catalyst of our invention is also unusually stable upon exposure to air and retains its effectiveness for a much longer period of time than known cyclooligomerization catalysts. Furthermore, the novel catalysts of our invention are generally more selective for the highly desired cyclooctadienes than other catalysts and retain this high selectivity over a wide range of catalyst concentration. The unexpected efficiency of our catalysts is apparent from an inspection of the preceding examples.

Although the invention has been described in considerable detail with particular reference to certain preferred embodiments thereof, variations and modifications can be effected within the spirit and scope of the invention as described hereinbefore and as defined in the appended claims.

We claim:

1. A cyclooligomerization process for the production of a cyclooctadiene from a 1,3-diene which comprises contacting a 1,3-diene with a catalyst system comprising zerovalent nickel complexed with an organo-phosphorus complexing ligand and containing an excess of at least 24 moles of said complexing ligand per mole of nickel.

2. The process of claim 1 in which the organo-phosphorus ligand is selected from the group consisting of:
    (a) tri(hydrocarbyl)phosphines and
    (b) tri(hydrocarbyl)phosphites.

3. A cyclooligomerization process for the production of a cyclooctadiene from a 1,3-diene which comprises contacting a 1,3-diene with a catalyst system comprising zerovalent nickel complexed with an organo-phosphorus complexing ligand and containing an excess of at least 24 moles of said ligand per mole of nickel; said organo-phosphorus ligand being selected from the group consisting of:
    (a) tri(hydrocarbyl)phosphines and
    (b) tri(hydrocarbyl)phosphites
and said contacting being carried out at a temperature of about 20° C. to about 225° C. and a pressure of up to about 150 atmospheres.

4. A cyclooligomerization process for the production of a cyclooctadiene from a 1,3-diene which comprises contacting a 1,3-diene with a catalyst system comprising zerovalent nickel complexed with an organo-phosphorus complexing ligand and containing an excess of at least 24 moles of said ligand per mole of nickel; said organo-phosphorus ligand being selected from the group consisting of:
    (a) tri(hydrocarbyl)phosphines and
    (b) tri(hydrocarbyl)phosphites
in which each hydrocarbyl group contains 1 to about 10 carbon atoms and said contacting being carried out at a temperature of about 80° C. to about 175° C. and a pressure of up to about 150 atmospheres.

5. A cyclooligomerization process for the production of a cyclooctadiene from 1,3-butadiene which comprises contacting 1,3-butadiene with a catalyst system comprising zerovalent nickel complexed with an organo-phosphorus complexing ligand and containing an excess of at least 24 moles of said ligand per mole of nickel; said organo-phosphorus ligand being selected from the group consisting of:
    (a) tri(hydrocarbyl)phosphines and
    (b) tri(hydrocarbyl)phosphites
in which each hydrocarbyl group contains 1 to about 10 carbon atoms and said contacting being carried out at a temperature of about 80° C. to about 175° C. and a pressure of up to about 150 atmospheres.

6. A cyclooligomerization catalyst system comprising zerovalent nickel complexed with an organo-phosphorus complexing ligand and containing an excess of at least 24 moles of said organo-phosphorus complexing ligand per mole of nickel.

7. The catalyst system of claim 6 in which the organo-phosphorus complexing ligand is selected from the group consisting of:
(a) tri(hydrocarbyl)phosphines and
(b) tri(hydrocarbyl)phosphites.

8. A cyclooligomerization catalyst system comprising zerovalent nickel complexed with an organo-phosphorus complexing ligand and containing an excess of at least 24 moles of said ligand per mole of nickel; said organo-phosphorus ligand being selected from the group consisting of:
(a) tri(hydrocarbyl)phosphines and
(b) tri(hydrocarbyl)phosphites in which each hydrocarbyl group contains 1 to about 10 carbon atoms.

9. A cyclooligomerization catalyst system comprising zerovalent nickel complexed with tri(o-tolyl)phosphite and containing an excess of at least 24 moles of tri(o-tolyl)phosphite per mole of nickel.

References Cited

FOREIGN PATENTS

| 987,423 | 3/1965 | Great Britain | 260—666 |
| 917,103 | 1/1963 | Great Britain | 260—666 |
| 970,335 | 9/1964 | Great Britain | 260—666 |

DELBERT E. GANTZ, *Primary Examiner.*

V. O'KEEFE, *Assistant Examiner.*